Jan. 25, 1966 W. N. MORONEY 3,231,300
CONNECTING MEANS
Filed Dec. 22, 1961

WILLIAM N. MORONEY
INVENTOR
BY John R. Faulkner
John J. Roethel
ATTORNEYS

United States Patent Office 3,231,300
Patented Jan. 25, 1966

3,231,300
CONNECTING MEANS
William N. Moroney, Detroit, Mich., assignor to Ford Motor Company, Dearborn, Mich., a corporation of Delaware
Filed Dec. 22, 1961, Ser. No. 161,540
1 Claim. (Cl. 287—93)

This invention relates to a connecting means and more particularly to a connecting device adapted to retain a rod in coupled relation to a lever member or the like.

It is current practice to utilize spring clips for coupling rodlike elements to lever members or the like. These spring clips, which are clamped to the lever member, have two projecting arms defining an opening adapted to receive the end portion of a rodlike element provided with an annular groove. The projecting arms snap into the groove to prevent the withdrawal of the rodlike element from the member. This type of spring clip connection has the inherent disadvantage of providing a metal-to-metal contact between the coupled elements. This, under vibratory operating conditions, is a source of noise. The noise generated has a tendency of being transmitted through and amplified by the assembled metallic elements, especially when utilized in motor vehicle construction as, for example, in the installation of an actuating rod between a door handle and an actuating lever of the door latch mechanism.

It is an object of the present invention to provide a simple and economical connecting device which is free from noise and does not require any lubrication to effect this advantage. To accomplish this, the connecting device of this invention is fabricated from a relatively resilient plastic material which is interposed between the metallic elements to be connected. The connecting device is particularly adapted for use in areas of limited accessibility with resultant savings in time and effort and without the requirement of special tools for its assembly or disassembly.

The connecting device embodying this invention comprises a head and a retention means. The retention means comprises a shank provided with a tapered shoulder which is compressible to permit its insertion through an opening in a substantially flat member to which an L-shaped rod is to be connected. Upon the projection of the shoulder through the opening, it expands to its original free dimension to secure the connecting device to the member. The head of the connecting device is provided with a retaining means which yieldably accommodates the rod, securing it against transverse and longitudinal movement thereof under normal use but still permits its disassembly if desired.

Other advantages of this invention will become more apparent as this description proceeds, particularly when considered in connection with the accompanying drawings, wherein.

Figure 1:
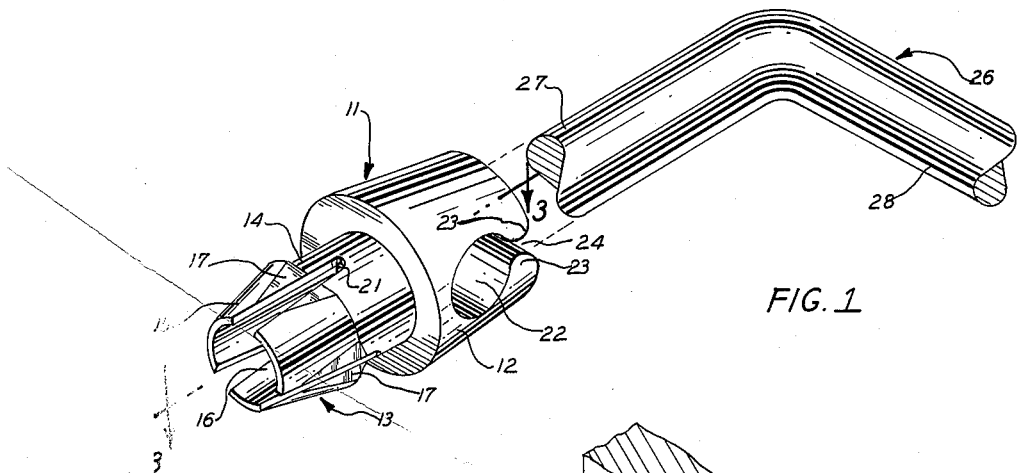
FIGURE 1 is an exploded view in perspective illustrating the fastening device of this invention about to receive a portion of an L-shaped connecting rod.

Referring now to the drawings, FIGURE 1 illustrates the connecting device of this invention, generally designated as 11, molded from a resilient plastic material such as nylon, for instance, having a head 12 at one end and a retention means 13 at the other end.

Figure 2:
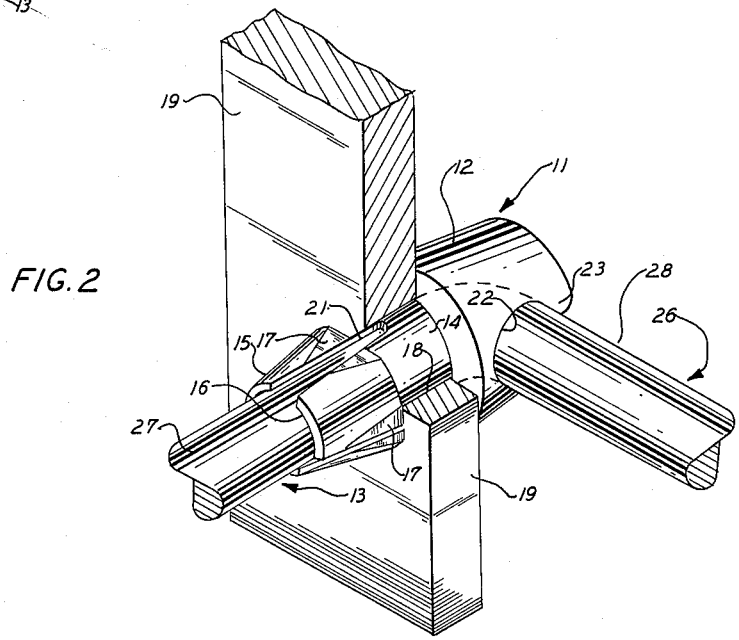
FIGURE 2 is a perspective view of a flat member shown partially in section with a portion of the L-shaped member retained in the fastening device.

The retention means 13 comprises a shank 14 having a tapered shoulder 15 at one end which is slightly larger in diameter than the shank 14. A first bore 16 concentric with the axis of the connecting device 11 extends through the shoulder 15 and the shank 14 of the retention means 13. The shoulder 15 is provided with flats 17 on its exterior peripheral surface to facilitate the insertion of the shoulder 15 through an aperture 18 provided in a lever member 19 as seen in FIGURE 2.

The tapered shoulder 15 and a portion of the shank 14 are provided with slots 21 between their internal and external peripheral surfaces. The slots 21, which bisect the flats 17 on the shoulder 15, are of sufficient width to permit the tapered shoulder 15 to be resiliently compressed to the diameter of the aperture 18 as it is forced through the aperture 18 during the assembly of the connecting device 11 to the member 19.

Figure 3:
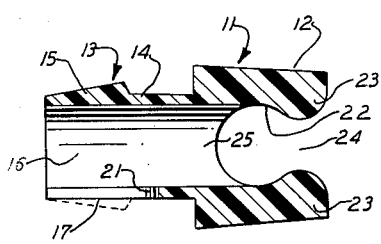
FIGURE 3 is a sectional view of the fastening device taken at line 3—3 of FIGURE 1.

The head 12 of the connecting device 11, which is larger than the diameter of the shank 14, is provided with a generally cylindrically shaped recess 22 normal to the axis of the connecting device 11. This recess 22 has a pair of lips 23 extending in a direction generally parallel with the axis of the recess 22 to define a rectangularly shaped opening 24 as seen in FIGURE 1. A second bore 25 in the head 12, which is coaxial with and of the same diameter as the first bore 16, places the cylindrically shaped recess 22 in communication with the first bore 16 as seen in the sectional view of FIGURE 3.

To assemble the connecting device 11 to the member 19, the tapered shoulder 15 is forced through the aperture 18 in the member 19 until the tapered shoulder 15 projects through the aperture 18, thereby containing the shank 14 within the aperture 18. The tapered shoulder 15 is then free to expand to its original free dimension. The expanded shoulder together with the head 12 provides a means for preventing the withdrawal of the connecting device 11 from the member 19.

To secure an L-shaped rod 26 to the connecting device 11 retained in the member 19, one transverse leg 27 and a second longitudinal leg 28 of the L-shaped connecting rod 26 are forced through the rectangularly shaped opening 24 in the head 12, thereby expanding lips 23. After the transverse leg 27 and a portion of the second longitudinal leg 28 are received by the first and second bores 16 and 25 and the cylindrically shaped recess 22, respectively, the lips 23 return to their original position as seen in FIGURE 2. To permit a relatively tight, noiseless connection between the rod 26 and the member 19, the first and second bores 16 and 25 are designed to be of approximately the same diameter as the diameter of the rod 26.

From the description, it can be seen that the L-shaped rod 26 is now secured against transverse and longitudinal movement thereof to provide a firm connection between one end portion of the L-shaped rod 26 and the lever member 19 by the use of the connecting device 11.

It is to be understood that the form of the invention is not to be limited to the exact construction shown and described but that various changes and modifications may be made without departing from the spirit and scope of the invention as defined in the appended claim.

What is claimed is:

A connecting means comprising in combination, a connecting device, an L-shaped rod, and a member having an aperture therein, said connecting device comprising an enlarged head portion and a retention means for securing said connecting device to said member, said retention means comprising a reduced substantially cylindrical shank portion secured to the head at one end and having a tapered shoulder portion at the other end which is slightly larger in cross sectional area than said shank, said head portion being in a coaxial relationship to said shank portion, said tapered shoulder portion containing slots and being resiliently compressible to the dimension of the aperture in said member, said shoulder portion also having flat portions bisected by said slots, said shoulder portion upon projecting through said aperture expanding to its original free dimension thereby positioning said member between said head and shoulder portions to prevent withdrawal of said connecting device from said aperture, said head having a cylindrically shaped recess extending generally normal to the axis of said connecting device and partially bisecting said head portion and adapted to receive one leg of said L-shaped rod, a bore extending through said shoulder portion, shank portion and into said head portion and being generally concentric with the axis of said connecting device, said bore intersecting said cylindrically shaped recess and being adapted to receive a second leg of said L-shaped rod, said cylindrically shaped recess having at least one rounded lip extending generally parallel with the axis of said cylindrically shaped recess and projecting across part of said cylindrically shaped recess to define an access opening which is smaller in cross sectional area than the cross sectional area of said rod, said lip being yieldable so as to expand said access opening to the cross sectional area of said rod upon forcing one leg of said L-shaped rod through said opening into said bore and a portion of the second leg of said L-shaped rod through said opening into said cylindrically shaped recess, said lip returning to its original position after said portion of the second leg of said rod is received in said cylindrically shaped recess to secure said rod against longitudinal and transverse movement thereof.

References Cited by the Examiner

UNITED STATES PATENTS

| 2,573,600 | 10/1951 | Pruehs | 339—103 |
| 2,975,814 | 3/1961 | Tinnerman | 151—41.75 |
| 3,004,238 | 10/1961 | Damon. | |
| 3,007,725 | 11/1961 | Becker et al. | 287—93 X |

FOREIGN PATENTS 1,111,742   11/1955   France.

CARL W. TOMLIN, *Primary Examiner.*

WALTER A. SCHEEL, *Examiner.*